United States Patent Office 2,764,372
Patented Sept. 25, 1956

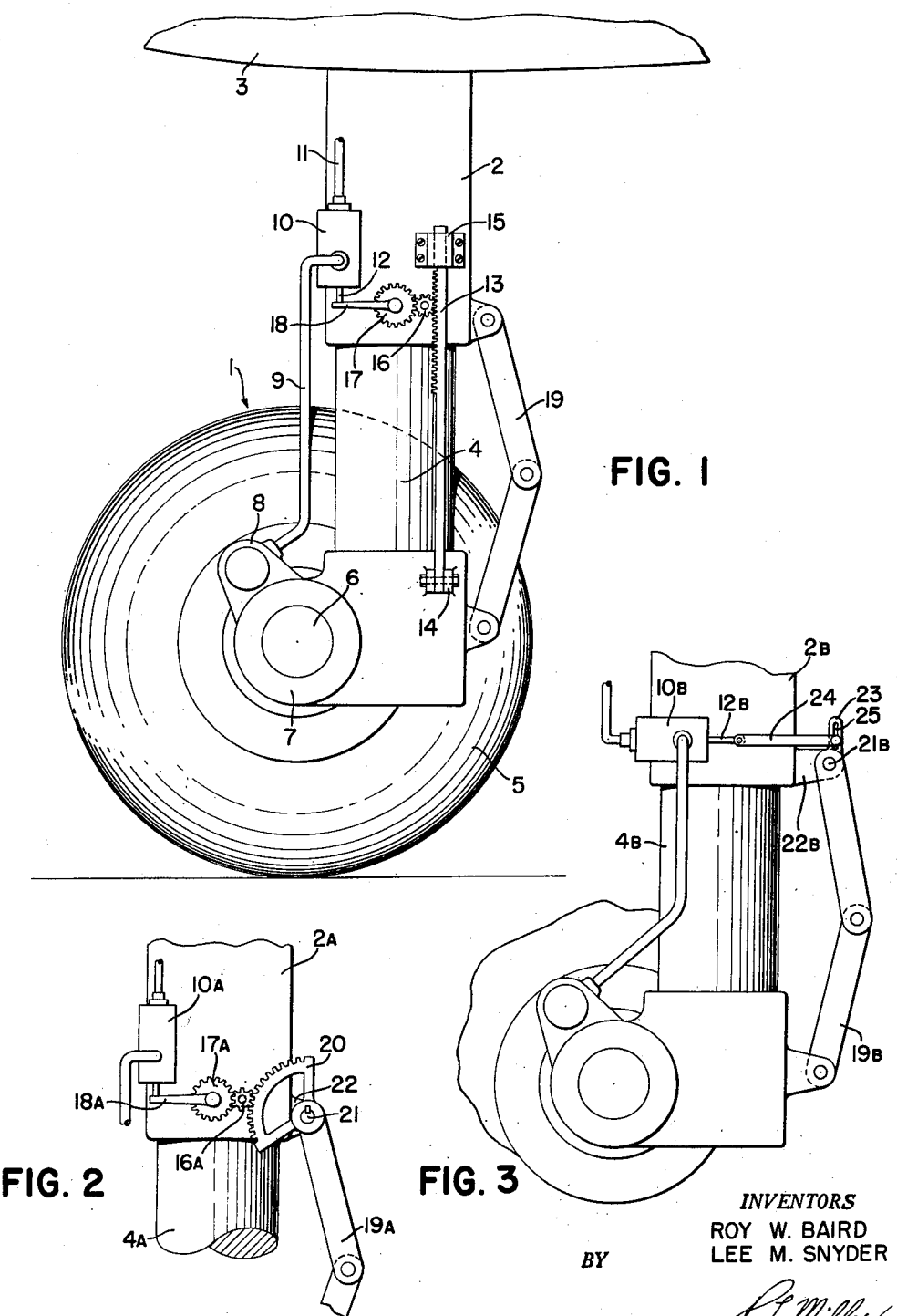

2,764,372

LANDING GEAR BRAKE PRESSURE METERING APPARATUS

Roy W. Baird and Lee M. Snyder, Akron, Ohio, assignors, by mesne assignments, to The Goodyear Tire & Rubber Company, a corporation of Ohio Application May 15, 1953, Serial No. 355,238

1 Claim. (Cl. 244—111)

This invention relates to brake means, and it particularly relates to a brake pressure metering system especially adapted for use with aircraft landing gear apparatus or similar means wherein one support member moves telescopically with relation to another upon the application of pressure to the apparatus and wherein such relative movement can be used for controlling or metering the amount of a fixed braking pressure transmitted to the brake means for operation thereof.

Heretofore there has been quite a bit of work done to try to develop some type of means for use, especially with the support gear for aircraft, so as to prevent skidding the wheels when braking pressures are applied to the brakes controlling the wheels, such as aircraft wheels when the aircraft is landing. The various types of brake control means proposed, such as electrical or mechanical means rotating with the wheel, have operated in various manners for attempting to reduce or shut off braking forces prior to actual skidding of the wheels. Skidding of the wheels is objectionable inasmuch as the support struts in the aircraft, the tires, and/or other means associated with the aircraft may be stressed excessively if skidding action occurs during the landing operation.

The types of anti-skid apparatus provided heretofore have not functioned in a completely satisfactory manner, insofar as we are aware, nor has such apparatus been of a desirable low cost but sturdy construction.

The general object of the present invention is to provide a new and improved mechanical type of a control for use in brake systems for preventing the skidding of wheels during landing operations.

Another object of the invention is to provide a relatively uncomplicated type of a brake pressure metering control apparatus especially adapted for use with telescoping type aircraft support struts and wherein a minimum of maintenance is required on the operating parts of the control.

Another object of the invention is to provide a control means in an aircraft braking system separate from the wheels whereby maximum braking forces can be applied to the wheels safely and with no resultant skidding action being produced under normal operating conditions.

A further object of the invention is to develop a brake pressure metering and control apparatus which can be easily applied to conventional existing aircraft support apparatus for use in the braking systems of the aircraft.

Still another object of the invention is to provide a new type of a brake pressure control system of a mechanical type which is adapted to be used with conventional or known types of brake anti-skid control means so that the brake pressure metering means of the invention may function to control braking pressures on dry pavements, whereas the anti-skid means may take over to control braking forces on wet pavements.

Another object of the invention is to provide brake pressure control apparatus adapted for use with brake anti-skid means to avoid excessive pressure cycling as may occur when anti-skid means alone are used to control braking action.

The foregoing and other objects of the invention will be made more apparent as the specification proceeds. In order to understand the principles of the present invention, reference should be had to the accompanying drawing, wherein:

Fig. 1 is an elevation of the brake pressure control or metering apparatus of the invention showing it operatively associated with an aircraft support strut;

Fig. 2 is a fragmentary elevation of a modified type of control of the invention; and Fig. 3 is a fragmentary elevation of yet another modified type of apparatus of the invention.

The apparatus of the invention in general relates to a brake assembly associated with a telescoping type support strut that operatively positions a support wheel thereon, and a brake pressure supply means is associated with the apparatus for providing hydraulic fluid under braking pressures for brake operation. The novel means of the invention particularly relate to a variable pressure transmittal or metering valve, and means that are connected between relatively movable portions of the support strut and connect to the metering valve for controlling the setting of the metering valve to determine the percentage or amount of the supplied braking pressure that is transmitted through the control valve for brake operation dependent upon the load on the support strut and the relative positions of the relatively movable sections thereof.

In the accompanying drawings and the specification, corresponding numerals are used to refer to corresponding parts to facilitate comparison between the drawings and the specification and identification of similar parts therein.

With reference to the details of the structure shown in the drawings, the brake pressure metering apparatus of the invention is indicated as a whole by the numeral 1 and it is shown in association with a conventional oleo or telescoping type of an aircraft support strut which has a fixed section 2 suitably secured with relation to the fuselage or wing of an aircraft indicated at 3 and a movable section 4 in telescopic engagement with and carried by the fixed section 2. A support wheel 5 is operatively associated with the movable strut section 4 and it is shown carried by a stub axle 6 journalled in a support housing 7 secured to the exposed end of the movable support or strut section 4.

Conventional braking means are operatively associated with the wheel 5 and are indicated at 8. A suitable flexible brake fluid supply line 9 connects to such brake means 8.

An important element of the brake pressure control or metering apparatus of the invention is a metering or control valve 10 usually secured to the fixed strut section 2. Such valve 10 is of conventional construction and it is adapted to receive braking fluid under pressure through a pressure supply conduit 11 connecting to the input side of the valve 10. The output of the valve 10 connects to the supply conduit 9 for transmittal of braking fluid, under desired pressure, to the brake means 8. The valve 10 is of such a construction that by adjustment of a control finger 12 which protrudes from the valve and is movable axially with relation thereto, the amount of pressure transmitted through the valve 10 can be varied dependent upon the operating conditions desired and the load on the support strut.

In order to control the brake pressure applied to the wheel 5 and correlate such braking pressure to the load on such wheel 5, the novel apparatus of the invention includes rack 13 shown pivotally secured to a bracket 14 on the housing 7, and slidably engaged with a guide plate 15 on the fixed strut section 2. This gear rack 13 engages a small gear 16 journalled on the fixed strut section 2 and which, in turn, engages a relatively large diameter gear 17 also journalled on the fixed strut section 2 and used for controlling the setting of the control finger 12 of the valve 10. Such control normally is effected by having an operating lever 18 fixedly secured to the gear 17 or to the shaft on which the gear 17 is journalled and with such lever 18 engaging with and pressing against the end of the finger 12 for moving it axially of the valve 10. The finger 12 likewise is urged against the lever 18 by means (not shown) in the valve 10. Thus with rotation of the gears 16 and 17 by relative movement of the movable and fixed strut sections, the setting of the control valve 10 can be widely varied and be accurately controlled so that the pressure transmitted through such valve is in desired proportional relationship to the load applied to the wheel 5, as indicated by relative movement of the movable strut section 4 with relation to the fixed strut section 2. Hence, as greater load is applied to the wheel 5, then greater braking forces can be applied to such wheel without producing any skidding action therein. Inasmuch as the operating conditions for any brake can be determined for dry landing conditions, for example when the support strut is used on an airplane, then the maximum braking pressures without skidding can be established and the brake pressure control means of the invention 1 will limit the brake pressure to desired values and prevent any skidding action of the support wheel 5.

Usually relative movement between the movable strut section 4 and the fixed strut section 2 is limited by means of a toggle 19.

A modification of the invention is shown in Fig. 2 wherein the apparatus is in general similar to that shown in Fig. 1. However, in this embodiment of the invention, a valve 10a is controlled through a controlled lever 18a which in turn is operated by gears 16a and 17a. As a change in this embodiment of the invention, the gear 16a is controlled by means of a relatively large diameter gear segment 20 carried by a stub shaft 21 and keyed to such stub shaft for rotation therewith. The stub shaft 21 is used to journal one end of a toggle 19a on a bracket 22 on the fixed strut section 2a. Thus upon relative movement of the movable strut section 4a and the fixed strut section 2a, the toggle 19a will necessarily have its position varied to rotate the stub shaft 21 through small arcs. Such movement thus is used for controlling the setting of the valve 10a and producing the desired control of braking pressures by the apparatus of the invention.

The apparatus shown in the modification of the invention in Fig. 3 includes a fixed strut section 2b, a movable strut section 4b, and a control or metering valve 10b. A toggle 19b is shown connected between the movable and fixed strut sections and with a stub shaft 21b journalling one end of the toggle 19b on a bracket 22b on the fixed strut section. In this instance, the control valve 10b is positioned in a slightly different manner than in the other embodiments of the invention, and a control finger 12b extends therefrom. This control finger 12b is then in turn positioned by and controlled through the action of the toggle 19b. The toggle 19b has a little extension ear 23 provided thereon, usually formed integrally with one of the arms of the toggle so that a connector link 24 can extend between and connect such ear 23 to an end of the control finger or member 12b of the valve 10b. Hence relative movement of the movable strut section with relation to the fixed strut section will be registered on the valve 10b through the control means provided so that the desired anti-skid control is provided. Usually the ear 23 has a slot 25 therein to aid in adjusting the apparatus when installed. If necessary, any suitable length adjusting member may be provided in the link 24, such as some type of turnbuckle or lock nut means to control the length thereof and aid in adjusting the action and setting of such means.

If desired, the apparatus of the invention may be used in association with aircraft wheels that have other types of anti-skid means associated therewith and operated through motion of the support wheel itself. Thus such anti-skid means in the wheel may be provided as a safety measure so that when the coefficient of friction for the support wheel varies, as when used on icy or wet landing strips, then the anti-skid means directly connected to the wheel may take over and prevent skidding action thereof. However, the means of the invention can be set so that they will effectively prevent any skid of the wheels under normal dry landing conditions.

From the foregoing, it is contended that the objects of the invention have been achieved and that a novel type of brake pressure control means has been furnished, which means operate in direct proportion to the load applied to the support wheel and which function independently of the rotation of the wheel. Thus it is contended that the objects of the invention have been achieved.

While certain representative embodiments and details have been shown for the purpose of illustrating the invention, it will be apparent to those skilled in this art that various changes and modifications may be made therein without departing from the spirit or scope of the invention.

We claim:

An airplane brake assembly including a telescoping type strut having a fixed section and a movable section, a wheel carried by the movable section, a hydraulic brake on the wheel, a metering valve carried by the fixed section, a fluid pressure connection to the valve, a flexible conduit from the valve to the brake, said valve having a stem slidably protruding therefrom and operating when pushed into the valve to allow the valve to pass more fluid, a lever arm pivotally mounted on the fixed section and engaging at its unpivoted end with the stem, a gear fixed to the pivoted end of the lever, an idler gear pivoted on the fixed section and engaging the gear, and a rack fixed to the movable section and slidably mounted in the fixed section and engaging the idler gear so that upon movement of the movable section into the fixed section the valve is opened further to allow greater braking action.

References Cited in the file of this patent

UNITED STATES PATENTS

| | | |
|---|---|---|
| 2,490,641 | Levesque du Rostu | Dec. 6, 1949 |
| 2,574,426 | Trevaskis | Nov. 6, 1951 |